US012637966B2

(12) United States Patent
Arulraj et al.

(10) Patent No.: US 12,637,966 B2
(45) Date of Patent: May 26, 2026

(54) COATED FILTERS

(71) Applicant: JOHNSON MATTHEY PUBLIC LIMITED COMPANY, London (GB)

(72) Inventors: Kaneshalingam Arulraj, Royston (GB); Thomas Hotchkiss, Royston (GB); David Marvell, Royston (GB); Stuart Reid, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 18/356,263

(22) Filed: Jul. 21, 2023

(65) Prior Publication Data

US 2024/0044271 A1 Feb. 8, 2024

(30) Foreign Application Priority Data

Aug. 5, 2022 (GB) ...................................... 2211445

(51) Int. Cl.

| | |
|---|---|
| ***B01D 53/02*** | (2006.01) |
| ***B05D 1/12*** | (2006.01) |
| ***B05D 3/02*** | (2006.01) |
| ***F01N 3/022*** | (2006.01) |

(52) U.S. Cl.

CPC ............. *F01N 3/0222* (2013.01); *B05D 1/12* (2013.01); *B05D 3/0254* (2013.01); *B05D 2530/00* (2013.01); *B05D 2601/00* (2013.01); *F01N 2510/063* (2013.01)

(58) Field of Classification Search

CPC ... F01N 3/0222; F01N 2510/063; B05D 1/12; B05D 3/0254; B05D 2530/00; D05D 2601/00

See application file for complete search history.

(56) References Cited

U.S. PATENT DOCUMENTS

| | | | | |
|---|---|---|---|---|
| 2003/0162650 A1* | 8/2003 | Marques | .................. | B01J 35/19 502/64 |
| 2012/0117952 A1 | 5/2012 | Dotzel et al. | | |
| 2013/0243659 A1 | 9/2013 | Sutton et al. | | |

FOREIGN PATENT DOCUMENTS

| | | | |
|---|---|---|---|
| CN | 106590414 | A | 4/2017 |
| EP | 3122458 | B1 | 1/2020 |
| EP | 4013954 | A1 | 6/2022 |
| EP | 4140581 | A1 | 3/2023 |
| JP | H04224109 | A | 8/1992 |
| JP | 2004008940 | A | 1/2004 |
| JP | 2016539803 | A | 12/2016 |
| JP | 2021512791 | A | 5/2021 |
| JP | 2021535067 | A | 12/2021 |
| WO | 2011151711 | A1 | 12/2011 |
| WO | 2015082892 | | 6/2015 |
| WO | 2019149930 | A1 | 8/2019 |
| WO | 2020047503 | A1 | 3/2020 |
| WO | 2021028691 | A1 | 2/2021 |
| WO | 2021028692 | A1 | 2/2021 |

OTHER PUBLICATIONS

PubChem "Polydimethylsiloxanes" https://pubchem.ncbi.nlm.nih.gov/compound/Polydimethylsiloxanes; (Year: 2025).*

* cited by examiner

*Primary Examiner* — Christopher P Jones
(74) *Attorney, Agent, or Firm* — BakerHostetler

(57) ABSTRACT

The present disclosure relates to a powder coated article for filtering particulate matter from exhaust gases. The powder coated article comprises a coated monolith article, and a powder coating on the coated monolith article. The coated monolith article is a monolith article coated with an on-wall washcoat, and the powder coating comprises an inorganic particle and a silicone resin in a ratio of between 50:1 to 1:9. The present disclosure also relates to a method forming said powder coated article.

10 Claims, 2 Drawing Sheets

COATED FILTERS

FIELD OF THE INVENTION

The present disclosure relates to a powder coated article for filtering particulate matter from exhaust gases. The powder coated article comprises a coated monolith article, and a powder coating on the coated monolith article. The coated monolith article is a monolith article coated with an on-wall washcoat, and the powder coating comprises an inorganic particle and a silicone resin in a ratio of between 50:1 to 1:9. The present disclosure also relates to a method forming the powder coated article as described herein.

BACKGROUND OF THE INVENTION

There are concerns about emissions of particulate matter (PM), commonly referred to as soot, from internal combustion engines and especially from diesel and gasoline engines in automotive applications. The main concerns are associated with potential health effects, and in particular with very tiny particles having sizes in the nanometer range.

Diesel particulate filters (DPFs) and gasoline particulate filters (GPFs) have been fabricated using a variety of materials including sintered metal, ceramic or metal fibres etc., with the most common type in actual mass production being the wall-flow kind made from porous ceramic material fabricated in the form of a monolithic array of many small channels running along the length of the body. Alternate channels are plugged at one end so the exhaust gas is forced through the porous ceramic channel walls that prevent most of the particulate from passing through so only filtered gas enters the environment. Ceramic wall-flow filters in commercial production include those made from cordierite, various forms of silicon carbide and aluminium titanate. The actual shape and dimensions of practical filters on vehicles as well as properties such as the channel wall thickness and its porosity etc. depend on the application concerned. The average dimensions of the pores in the filter channel walls of a ceramic wall-flow filter through which the gas passes are typically in the range 5 to 50 μm and usually about 20 μm. In marked contrast, the size of most diesel particulate matter from a modern passenger car high speed diesel engine is much smaller, e.g. 10 to 200 nm.

Some PM may be retained within the pore structure in the filter walls and this may in some applications gradually build up until the pores are bridged over by a network of PM and this PM network then enables the easy formation of a cake of particulate on the internal walls of the filter channels. The particulate cake is an excellent filter medium and its presence affords very high filtration efficiency. In some applications soot is burned continuously on the filter as it is deposited which prevents a particulate cake from building up on the filter.

For some filters, for example light duty diesel particulate filters, it is periodically necessary to remove trapped PM from the filter to prevent the build-up of excessive back pressure that is detrimental to engine performance and can cause poor fuel economy. So in diesel applications, retained PM is removed from the filter by burning it in air in a process during which the amount of air available and the amount of excess fuel used to achieve the high temperature needed to ignite the retained PM are very carefully controlled. Towards the end of this process, that is usually called regeneration, the removal of the last remaining particulate in the filter can lead to a marked decrease in filtration efficiency and release of a burst of many small particles into the environment. Thus, filters may have low filtration efficiency when they are first used and subsequently after each regeneration event and also during the latter part of each regeneration process.

Thus, it would be desirable to improve and/or maintain filtration efficiency at all times—for example during the early life of a filter when it is first used, and or during regeneration and immediately afterwards, and or when the filter is loaded with soot.

WO2021/028692 (the entire contents of which is incorporated herein by reference) describes a vehicular exhaust filter comprising a porous substrate having an inlet face and an outlet face, the porous substrate comprising inlet channels extending from the inlet face and outlet channels extending from the outlet face; the inlet channels and the outlet channels being separated by a plurality of filter walls having a porous structure; the vehicular exhaust filter being loaded with a refractory powder having a tapped density before loading of less than 0.10 g/cm$^3$; the vehicular exhaust filter having a mass loading of the refractory powder of less than 10 g/L; and wherein greater than 40% of the refractory powder is located within the porous structure of the plurality of filter walls and less than 60% of the refractory powder is coated on an external surface of the plurality of filter walls. WO2021/028692 also describes suitable methods and apparatus for the spraying of a dry refractory powder, such as a dry particulate aerosol, onto the channels of a porous substrate, preferably wherein greater than 50% of the refractory powder, optionally up to 100% of the refractory powder, may be located with the porous structure of the plurality of filter walls.

The inventors developed the present invention to ameliorate and/or overcome the problems observed in the prior art. The present invention provides an improved method for the production of a more efficient coated monolith article which advantageously demonstrates higher water tolerance and improved filtration efficiencies.

SUMMARY OF THE INVENTION

The invention relates to a powder coated article, said powder coated article comprising a coated monolith article, and a powder coating on the coated monolith article. The coated monolith article is a monolith article coated with an on-wall washcoat, and the powder coating comprises an inorganic particle and a silicone resin in a ratio of between 50:1 to 1:9.

The invention further relates to a method of forming said coated monolith article and to a calcined powder coated article.

The invention also relates to a powder coated article/calcined powder coated article for the treatment of exhaust gases and a vehicular exhaust system comprising the powder coated article/calcined powder coated article.

DETAILED DESCRIPTION OF THE INVENTION

Figure 1:
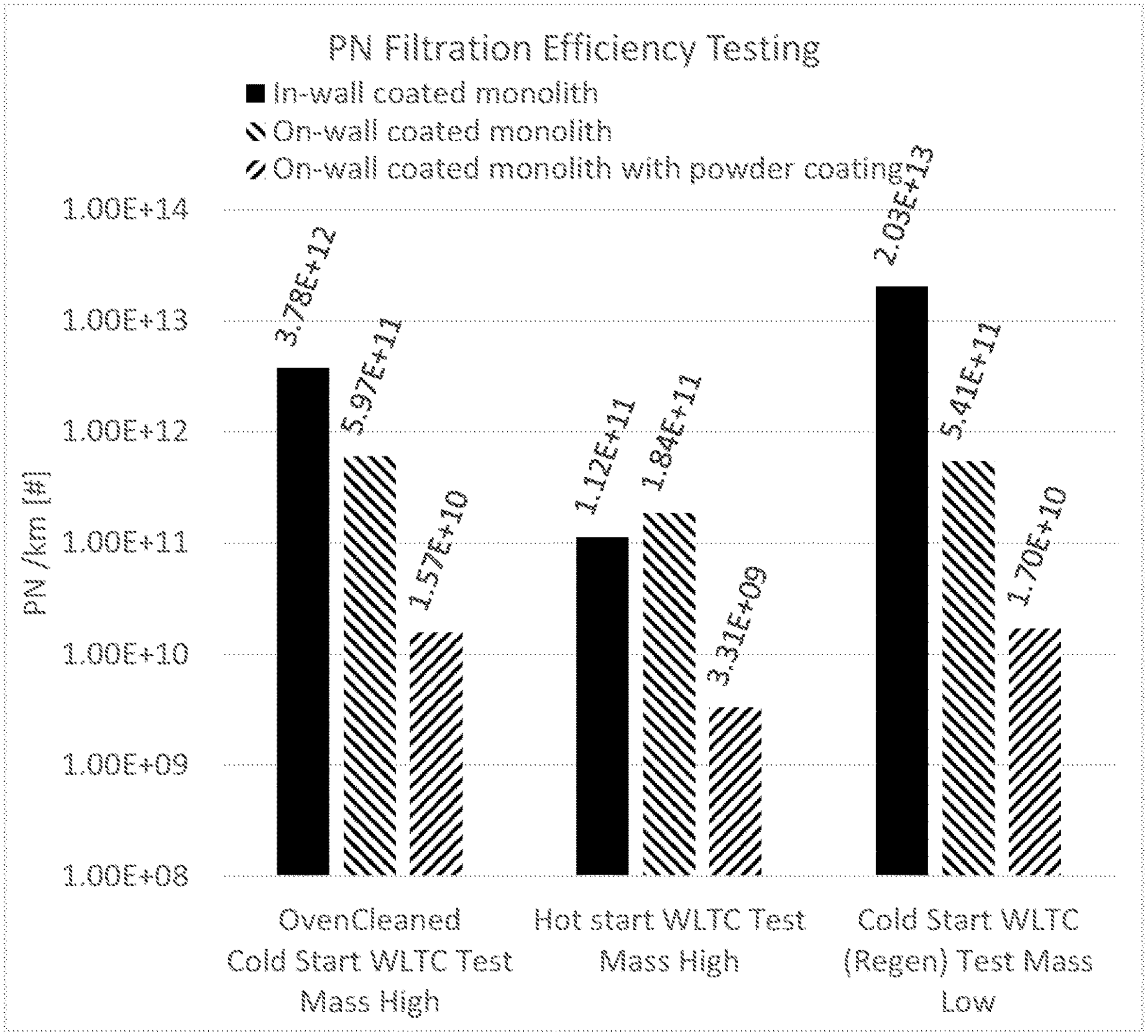
FIG. 1 shows the filtration efficiency for a standard (in-wall) coated monolith article, a (on-wall) coated monolith article and a powder coated monolith article according to the invention.

In one embodiment, the invention relates to a powder coated article, said powder coated article comprising:

a) a coated monolith article, and b) a powder coating on the coated monolith article, wherein said coated monolith article is a monolith article coated with an on-wall washcoat, and said powder coating comprising an inorganic particle and a silicone resin in a ratio of between 50:1 to 1:9.

In a further embodiment, the invention relates to a method of forming a powder coated article as described herein, said method comprising:

i) providing a coated monolith article, ii) spraying onto the coated monolith article, as a dry particulate aerosol, inorganic particles and a silicone resin to form a powder coating layer, wherein said inorganic particles and silicone resin are in a ratio of between 50:1 to 1:9.

In a further embodiment, the invention relates to a calcined powder coated article, said powder coated article comprising:

a) a coated monolith article, and b) a calcined powder coating on the coated monolith article, wherein said coated monolith article is a monolith article coated with an on-wall washcoat, and said calcined powder coating comprising an inorganic particle and silicon dioxide in a ratio of between 65:1 to 1:7.

In a further embodiment, the invention relates to a powder coated article or a calcined powder coated article as herein described for the treatment of an exhaust gas.

In a further embodiment, the invention relates to a vehicular exhaust system comprising the powder coated article or calcined powder coated article as herein described.

The present disclosure will now be described further. In the following passages, different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

Coated Monolith Article

The monolith article is a coated monolith article. The coating comprises one or more washcoats, preferably catalytic washcoats. A washcoat is a composition that coats the porous structure of the article. The article comprising said one or more washcoats is preferably then calcined prior to spraying the inorganic particles and silicone resin onto the channels as described herein.

The catalytic washcoat may comprise a catalyst, selected from the group consisting of a hydrocarbon trap, a three-way catalyst (TWC), a NOx absorber, an oxidation catalyst, a selective catalytic reduction (SCR) catalyst, a lean NOx catalyst and combinations of any two or more thereof The catalyst, for example the TWC, NOx absorber, oxidation catalyst, hydrocarbon trap and the lean NOx catalyst, may contain one or more platinum group metals, particularly those selected from the group consisting of platinum, palladium and rhodium.

Consequently, the coated monolith article may, for example, be a catalysed soot filter (CSF), a selective catalytic reduction filter (SCRF), a lean NOx trap filter (LNTF), a gasoline particulate filter (GPF), an ammonia slip catalyst filter (ASCF) or a combination of two or more thereof (e.g. a filter comprising a selective catalytic reduction (SCR) catalyst and an ammonia slip catalyst (ASC).

The coated monolith article is coated with an on-wall washcoat. "On-wall" means that the washcoat is present as a coating on the walls of the monolith article. The coating can be present on the walls of the monolith article in a thickness of about 0.1 to 50% (e.g. from 0.1 to 30% or from 0.5 to 15%) of the thickness of the wall upon which the coating is disposed. Some of the on-wall coating can be present in-wall. "In-wall" means that the washcoat is present in the pores within the porous monolith article.

A monolith article can comprise a plurality of channels for the passage of an exhaust gas, each channel having a gas-contacting surface. Monolith articles are well-known in the art. Monolith articles may sometimes be referred to as substrates, preferably honeycomb substrates, preferably ceramic honeycomb substrates. Such substrates comprise a plurality of channels which are suitable for the passage of an exhaust gas. The channels are parallel and run from an inlet end (or a first end) to an outlet end (or a second end), i.e., the channels run axially through the article. Adjacent channels can be alternatively plugged at each end of the monolith article such that, in use, the exhaust gas passes along an inlet channel (i.e., a channel open at an inlet end of the monolith article for receiving an exhaust gas) and is forced to pass through the channel walls an into an adjacent outlet channel (i.e., a channel open at an outlet end of the monolith article). Monolith articles can comprise a plurality of inlet channels and a plurality of outlet channels. Typically, the channels have a square cross-section though any known monolith design may be employed.

In a preferred embodiment, between 15-100% of the washcoat loading of the total monolith article is present on-wall, preferably between 16-99%, between 17-95%, between 18-90%, between 19-80%, or between 20-75%. In an alternative embodiment, at least 15%, at least 16%, at least 17%, at least 17%, at least 18%, at least 19%, at least 20%, at least 21%, at least 22% or at least 25% of the washcoat loading of the total monolith article is present on-wall. In a particularly preferred embodiment, at least 15% or at least 20% of the washcoat loading of the total monolith article is present on-wall.

In a preferred embodiment, between 50-100% of the washcoat loading in the inlet channels of the monolith article is present on-wall, preferably between 55-99%, between 60-95%, between 65-92%, between 70-90%, or between 80-90%. In an alternative embodiment, at least 50%, at least 55%, at least 60%, at least 65%, at least 70%, at least 75%, at least 80%, at least 85%, at least 90% or at least 95% of the washcoat loading in the inlet channels of the monolith article is present on-wall. In a particularly preferred embodiment, at least 80% or at least 90% of the washcoat loading in the inlet channels of the monolith article is present on-wall.

In a preferred embodiment, between 5 and 100% of the part (e.g. the article, the inlet channels and/or the outlet channels) is coated with an on-wall washcoat. Preferably between 5 and 100%, 10 and 99%, between 20 and 98%, between 30 and 97%, between 40 and 96%, between 50 and 95%, between 60 and 94%, between 70 and 93%, between 80 and 90% of the part is coated with an on-wall washcoat, e.g. at least 5%, at least 20%, at least 50%, at least 60%, at least 70%, at least 75% or at least 80% of the part is coated with an on-wall washcoat.

As would be appreciated by a person skilled in the art, the percentage of the coating that is present "on-wall" can be determined by techniques of the art, such as scanning electron microscopy (SEM) or optical microscopy.

In some embodiments, the coated monolith article is coated with an on-wall washcoat which has one or more of the following features:

1) a $d_{90}$ of between 5-30 μm, e.g. between 10 and 28 μm, 15 and 25 μm, preferably about 20 μm,
2) a viscosity of between 5 and 1500 cPs, e.g. between 10 and 1400 cPs, between 50 and 1300, between 100 and 1200, between 200 and 1100, between 300 and 1000, between 400 and 950, between 500 and 900, between 550 and 850 cPs, between 600 and 800 cPs, between 650 and 750 cPs, preferably about 700 cPs,
3) a pore former, e.g. a cellulose pore former, for example, a pore former selected from Arbocel, Vivapur, Mipelon PM-200, Propyltex, Orgasol and Remyrise.

It has been found that using one or more of the above-mentioned features can help to promote the formation of an on-wall coating.

The viscosity can be measured at 20° C. on a Brookfield RV DVII+Extra Pro viscometer using a SC4-27 spindle at 50 rpm spindle speed.

Washcoats which can be used to coat the monolith article with an on-wall coating preferably comprise zeolites (e.g. metal loaded zeolites), binders and pore formers. Examples of zeolites include small pore, medium pore or large pore zeolites, e.g. CHA, AEI, FAU, FER and MFI. When metal loaded zeolites are used, metals can be selected from transition metals, e.g. one or more of Cu, Ce, Fe and Mn. Examples of binders are alumina binders, such as Boehmites, alpha alumina, beta alumina, and gamma alumina. Examples of pore formers include cellulose pore formers, polyethylene, starch, graphite, polypropylene, polyaramides, polytetrafluoroethylene, polystyrene, cellulose fibres and polymethacrylmethacrylate, e.g. Arbocel, Vivapur, Mipelon PM-200, Propyltex, Orgasol and Remyrise. In some embodiments, the zeolites and pore former are present in a ratio of between 10:1 to 1:3, preferably between 8:1 to 1:2, between 6:1 to 1:1.5, between 5:1 to 1:1, between 4:1 and 1.5:1, between 3:1 and 2:1, e.g. between 5:1 to 1:2 or 3:1 to 1:1. In some embodiments, the zeolites and binder (e.g. alumina binder) are present in a ratio of between 20:1 and 1:1, e.g. from 15:1 to 2:1, preferably from 12:1 to 3:1, e.g. from 10:1 to 5:1, more preferably about 9:1.

Preferably, the washcoat loading of the coated monolith article is between 0.1 g/in$^3$ and 10 g/in$^3$, preferably between 0.1 g/in$^3$ and 8 g/in$^3$, 0.5 g/in$^3$ and 7 g/in$^3$, 0.8 g/in$^3$ and 6 g/in$^3$, 1 g/in$^3$ and 5 g/in$^3$, 1.25 g/in$^3$ and 4 g/in$^3$, 1.5 g/in$^3$ and 3 g/in$^3$, 2 g/in$^3$ and 2.5 g/in$^3$. In a more preferred embodiment, the washcoat loading of the coated monolith article is between 0.5 g/in$^3$ and 5 g/in$^3$ or between 1 g/in$^3$ and 2.5 g/in$^3$.

The monolith article/substrate may be formed, for example, from sintered metal, ceramic or metal fibers, etc. For example, the article may be formed from cordierite, various forms of silicon carbide or aluminium titanate.

In some embodiments, the monolith article is a monolith filter. It is particularly preferred that the monolith filter is a wall-flow filter (which may be also be known as a wall-flow monolith article). A wall-flow filter is well-known and typically, adjacent channels are alternatively plugged at each end of the monolith article such that, in use, the exhaust gas passes along an inlet channel (i.e., a channel open at an inlet end of the monolith article for receiving an exhaust gas) and is forced to pass through the channel walls an into an adjacent outlet channel (i.e., a channel open at an outlet end of the monolith article).

The channel walls have a distribution of fine pores providing the monolith article with the required porosity, the average dimensions of the pores in the channel walls, e.g. the filter walls, are typically in the range from 5 to 50 μm. Each channel has a gas-contacting surface. That is, each channel has a surface suitable for contacting, for example, an exhaust gas when in use. The surface may be provided by the channel wall surface and/or by the pores contained therein.

In another particularly preferred embodiment, the monolith article is a catalyst article (i.e., a catalytic article). Catalytic monolith articles are well-known and exhibit a catalytic function such as oxidation, $NO_x$-trapping, or selective catalytic reduction activity.

In a particularly preferred embodiment, the monolith article is a catalytic wall-flow filter. Consequently, the article may, for example, be a catalyzed soot filter (CSF), a selective catalytic reduction filter (SCRF), a lean NOx trap filter (LNTF), a gasoline particulate filter (GPF), an ammonia slip catalyst filter (ASCF) or a combination of two or more thereof (e.g., a filter comprising a selective catalytic reduction (SCR) catalyst and an ammonia slip catalyst (ASC).

The shape and dimensions of the filter, for example properties such as the channel wall thickness and its porosity etc. may be varied depending on the intended application for the filter. The filter may be configured for use with an internal combustion engine to filter the exhaust gas emitted by the internal combustion engine. The internal combustion engine may be a gasoline spark ignition engine. However, the filter finds particular application when configured for use with an internal combustion engine in the form of a diesel or gasoline engine.

Powder Coating

There is a powder coating present on the coated monolith article. The powder coating comprises an inorganic particle and a silicone resin in a ratio, by weight, of between 50:1 to 1:9. In a preferred embodiment, the ratio, by weight, of the inorganic particle to silicone resin is between 40:1 and 1:8, between 30:1 and 1:7, between 20:1 and 1:6, between 10:1 and 1:5, between 9:1 and 1:4, between 8:1 and 1:3, between 7:1 and 1:2, between 6:1 and 1:1, between 5:1 and 2:1, or between 4:1 and 3:1. In a further preferred embodiment, the ratio, by weight, of the inorganic particle to silicone resin is between 10:1 and 1:3, preferably between 5:1 and 1:2, more preferably between 4:1 and 1:1, e.g. about 3:1.

Without wishing to be bound by theory, the inventors have found that the specific ratio of the inorganic particle to silicone resin can result in improved filtration efficiency and improved stability.

Preferably, the inorganic particles are selected from the group consisting of zeolites, refractory oxides, and their mixtures, preferably zeolites.

Zeolites are structures formed from alumina and silica and the SAR determines the reactive sites within the zeolite structure. The zeolite may be a small pore zeolite (e.g. a zeolite having a maximum ring size of eight tetrahedral atoms), a medium pore zeolite (e.g. a zeolite having a maximum ring size of ten tetrahedral atoms) or a large pore zeolite (e.g. a zeolite having a maximum ring size of twelve tetrahedral atoms) or a combination of two or more thereof.

Examples of suitable zeolites include silicate zeolite, aluminosilicate zeolite, metal-substituted aluminosilicate zeolite, AlPO, MeAlPO, SAPO, MeAPSO, and the like. In some embodiments, the zeolites are selected from aluminosilicate, borosilicate, gallosilicate, SAPO, AlPO, MeAPSO, and MeAPO zeolites.

When the zeolite is a small pore zeolite, then the small pore zeolite may have a framework structure represented by a Framework Type Code (FTC) selected from the group comprising (e.g. consisting of) ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SFW, SIV, THO, TSC, UEI, UFI, VNI, YUG and ZON, or a mixture and/or combination and/or an intergrowth of two or more thereof. In some embodiments, the small pore zeolite has a framework structure selected from the group comprising (e.g. consisting of) CHA, LEV, AEI, AFX, ERI, LTA, SFW, KFI, DDR and ITE. In some embodiments, the small pore zeolite has a framework structure selected from the group comprising (e.g. consisting of) CHA and AEI. The small pore zeolite may have a CHA framework structure.

When the zeolite is a medium pore zeolite, then the medium pore zeolite may have a framework structure represented by a Framework Type Code (FTC) selected from the group comprising (e.g. consisting of) AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI and WEN, or a mixture and/or an intergrowth of two or more thereof. In some embodiments, the medium pore zeolite has a framework structure selected from the group comprising (e.g. consisting of) FER, MEL, MFI, and STT. In some embodiments, the medium pore zeolite has a framework structure selected from the group comprising (e.g. consisting of) FER and MFI, particularly MFI. When the medium pore molecular sieve has a FER or MFI framework, then the zeolite may be ferrierite, silicalite or ZSM-5.

When the zeolite is a large pore zeolite, then the large pore zeolite may have a framework structure represented by a Framework Type Code (FTC) selected from the group comprising (e.g. consisting of) AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, or a mixture and/or an intergrowth of two or more thereof. In some embodiments, the large pore zeolite has a framework structure selected from the group comprising (e.g. consisting of) AFI, BEA, MAZ, MOR, and OFF. In some embodiments, the large pore zeolite has a framework structure selected from the group comprising (e.g. consisting of) BEA, MOR and FAU. When the large pore molecular has a framework structure of FTC BEA, FAU or MOR, then the zeolite may be a beta zeolite, faujasite, zeolite Y, zeolite X or mordenite.

In some embodiments, the zeolite has a framework type selected from ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EEI, EMT, EON, EPI, ERI, ESV, ETR, EUO, FAU, FER, FRA, GIS, GIU, GME, GON, GOO, HEU, IFR, IFY, IHW, IRN, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWF, MWW, NAB, NAT, NES, NON, NPO, NPT, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SFW, SGT, SOD, SOS, SSY, STF, STI, STT, TER, THO, TON, TSC, UEI, UFI, UOZ, USI, UTL, VET, WI, VNI, VSV, WIE, WEN, YUG, ZON, or combinations thereof. In some embodiments, the zeolite has a framework type selected from AEI, AFT, AFV, AFX, AVL, BEA, CHA, DDR, EAB, EEI, ERI, FAU, FER, IFY, IRN, KFI, LEV, LTA, LTN, MER, MOR, MWF, MFI, NPT, PAU, RHO, RIE, RTH, SAS, SAT, SAV, SFW, TSC, and UFI.

In another embodiment, the inorganic particles are refractory oxide particles which can be based on an oxide selected from the group consisting of alumina, silica, zirconia, ceria, chromia, magnesia, calcia, titania and mixed oxides of any two or more thereof. Preferably, the refractory oxide particles comprise calcium aluminate, fumed alumina, fumed silica, fumed titania, fumed zirconia, fumed ceria, alumina aerogel, silica aerogel, titania aerogel, zirconia aerogel, ceria aerogel or a mixture thereof. The one or more fumed refractory powders (refractory oxide particles) may be produced by a pyrogenic process, for example flame pyrolysis.

Preferably, the inorganic particles have a $d_{90}$ (by volume) of between 0.1 μm and 100 μm, preferably between 0.2 μm and 50 μm, between 0.5 and 40 μm, between 1 μm and 30 μm, between 2 μm and 20 μm, between 5 μm and 15 82 m, between 6 μm and 10 μm. In a preferred embodiment, the inorganic particles have a $d_{90}$ (by volume) of between 0.1 and 30 μm, between 0.5 and 20 μm or between 1 μm and 10 μm.

Preferably, the inorganic particles have a crystallite size of from 0.05 to 10 μm, preferably from 0.1 to 8 μm, from 0.5 to 6 μm, from 0.75 to 5 μm, from 1 to 4 μm, or from 2 to 3 μm. In a particularly preferred embodiment, the inorganic particles have a crystallite size of from 0.8 to 2.5 μm, e.g. from 1 to 2 μm.

The particle size can be measured by standard methods, such as scanning electron microscopy (SEM) and laser diffraction. If particle size measurements are obtained by Laser Diffraction Particle Size Analysis, they are done so using a Malvern Mastersizer 3000, which is a volume-based technique (i.e. D(v, 0.1), D(v, 0.5), D(v, 0.9) and D(v, 0.98) may also be referred to as DV10, DV50, DV90 and DV98 respectively (or D10, D50, D90 and D98 respectively) and applies a mathematical Mie theory model to determine a particle size distribution.

Silicone resins that can be used in the present invention are oligosiloxanes. Examples of silicone resins that can be used in the present invention are one or more of the following: polysilsesquioxanes or polysiloxanes, for example: polyalkylsilsesquioxanes (e.g. polymethylsilsequioxanes), polyphenylsilsequioxanes, polyalkylsiloxanes (e.g. polymethylsiloxanes) and polyphenylsiloxanes.

The silicone resin may be referred to herein as silicone resin particles. Preferably, the melting point of the silicone resin is less than 150° C., preferably less than 100° C., less than 90° C., less than 85° C. or less than 80° C. Without wishing to be bound by theory, the inventors believe that silicone resins which have such melting points are particularly suited for a powder coating process, i.e., for effective particulate dispersion across on the monolith article together with the inorganic particles, yet low enough to permit low temperature calcination thereby effectively and efficiently adhering the inorganic particles to the gas-contacting surface of the channel walls.

Preferably, the silicone resin (i.e., silicone resin particles) have a $d_{90}$ (by volume) of between 0.1 μm and 100 μm, preferably between 0.2 μm and 50 μm, between 0.5 and 40 μm, between 1 μm and 30 μm, between 2 μm and 20 μm, between 5 μm and 15 μm, between 6 μm and 10 μm. In a preferred embodiment, the silicone resin (i.e., silicone resin particles) have a $d_{90}$ (by volume) of between 0.1 μm and 30 μm, between 0.5 and 20 μm or between 1 and 10 μm.

Preferably, the mass loading of the powder coating (e.g. the total mass loading of the powder coating) is between 0.1 g/L and 50 g/L, e.g. between 0.5 g/L and 45 g/L, between 1 g/L and 40 g/L, between 2 g/L and 30 g/L or between 5 g/L and 25 g/L. Preferably, the mass loading of the inorganic particles is at between 0.05 g/L and 40 g/L, e.g. between 0.1 g/L and 30 g/L, between 1 g/L and 25 g/L, between 5 g/L and 20 g/L, or between 10 g/L and 15 g/L. Preferably, the mass loading of the silicone resin is between 0.05 g/L and 30 g/L, e.g. between 0.1 g/L and 25 g/L, between 0.5 g/L and 20 g/L, between 1 g/L and 15 g/L, or between 5 g/L and 10 g/L. By way of example, where the ratio of inorganic particles to silicone resin, by weight, is 1:1, the loading of inorganic particles may be 10 g/L and the loading of the silicone resin may be 10 g/L giving a total loading of the powder coating of 20 g/L. By way of example, where the ratio is 2:1, the inorganic particle loading may be 10 g/L and the silicone resin loading 5 g/L giving a total loading of 15 g/L.

The powder coating is on the coated article. By "on" it can be meant that the powder coating is directly on the coated article, i.e. with no intervening layers, or it could be meant that the powder coating is on the coated article, but one or more intervening layers are present. In a preferred embodiment, the powder coating is directly on the coated article.

Method of Forming the Powder Coated Article

The method of forming a powder coated article as herein described comprises a spraying onto the coated monolith article, as a dry particulate aerosol, inorganic particles and a silicone resin to form a powder coating layer. The method can comprise spraying a dry powder (i.e., dry particles) suspended in a gas (i.e., as an aerosol) onto the gas-contacting surface of the plurality of channels on the coated monolith article. The spraying of dry powders onto monolith articles is known in the art. Suitable methods and apparatus are described in, for example, WO2011/151711, WO2021/028692 and WO2021/028691.

In one preferred embodiment, the spraying step comprises a first spraying step wherein the inorganic particles are sprayed onto the coated monolith article as a first dry powder (i.e. dry particles) suspended in a gas (i.e. as an aerosol) to form an inorganic particle layer and in a second spraying step the silicone resin is then sprayed onto the inorganic particle layer as a second dry powder (i.e. dry particles) suspended in a gas (i.e. as an aerosol) to form the coating layer. Accordingly, the inorganic particles are sprayed onto the coated monolith article before the silicone resin is separately sprayed on the coated monolith article further coated with the inorganic particles.

In one preferred embodiment, the spraying step comprises a first spraying step wherein the silicone resin is sprayed onto the coated monolith article as a first dry powder (i.e. dry particles) suspended in a gas (i.e. as an aerosol) to form an silicone resin layer and in a second spraying step the inorganic particles are then sprayed onto the silicone resin layer as a second dry powder (i.e. dry particles) suspended in a gas (i.e. as an aerosol) to form the coating layer. Accordingly, the silicone resin is sprayed onto the coated monolith article before the inorganic particles are separately sprayed on the coated monolith article further coated with the silicone resin.

Even more preferably, a mixture of the inorganic particles and silicone resin is sprayed onto the coated monolith article as a dry powder (i.e. dry particles) suspended in a gas (i.e. as an aerosol) to form the powder coated article. Accordingly, an intimate mixture of the inorganic particles and silicone resin is coated onto the coated monolith article and provides enhanced adhesion of the inorganic particles to the coated monolith article upon calcination of the silicone resin.

In an alternative embodiment, inorganic particles and the silicone resin are sprayed onto the coated monolith article as dry powders (i.e. dry particles) suspended in gases (i.e. as aerosols) to form the powder coated article. In this embodiment, inorganic particles and the silicone resin are separately but simultaneously applied to the coated monolith article.

The terms "dry powders" or "dry particles" refers to a particulate composition that is not suspended or dissolved in a liquid. It is not meant to necessarily imply a complete absence of all water molecules. The dry powders/dry particles are preferably free-flowing.

In a preferred embodiment, the spraying step is performed under a constant flow of gas, as for example described in WO2021/028692. Gases can be selected from one or more of: air, nitrogen, argon, helium, oxygen, carbon dioxide, etc. In a preferred embodiment, the gas is air. In a particularly preferred embodiment, the gas flow is between 50 and 2,000 $m^3$/hr, e.g. between 80 and 1,500 $m^3$/hr, between 100 and 1,000 $m^3$/hr, between 80 and 500 $m^3$/hr, e.g. between 90 and 400 $m^3$/hr, between 100 and 300 $m^3$/hr, between 110 and 280 $m^3$/hr, between 150 and 250 $m^3$/hr or between 180 and 220 $m^3$/hr. In a further preferred embodiment, the gas flow is between 100 and 400 $m^3$/hr, e.g. from 150 to 350 $m^3$/hr or between 200 and 300 $m^3$/hr.

The present inventors have surprisingly found that using a low air flow ensures that the powder coating is deposited as an even layer along the channel with greater accumulation at the end of the article filling the void between the end of the powder coating layer and the end of the article.

The method can further comprise calcining the coating layer to provide a calcined powder coated article. That is, the method comprises calcining the powder coating layer having the inorganic particles and silicone resin sprayed thereon. The calcining step results in calcination of the silicone resin into silicon dioxide in the powder coating. In some embodiments, the calcining results in calcination of about 100% of the silicon resin into silicon dioxide. In other embodiments, calcining results in calcination of at least 95%, 90%, 80%, 75%, 60%, or 50% of the silicone resin into silicon dioxide.

The ratio, by weight, of the inorganic particle to silicon dioxide in the calcined powder coating can be between 65:1 to 1:7. In a preferred embodiment, the ratio, by weight, of the inorganic particle to silicon dioxide is between 50:1 and 1:6, between 38:1 and 1:6, between 25:1 and 1:5, between 13:1 and 1:4, between 11:1 and 1:3, between 10:1 and 1:2, between 9:1 and 1:1.5, between 8:1 and 1:0.8, between 6:1 and 3:1, or between 5:1 and 4:1. In a further preferred embodiment, the ratio, by weight, of the inorganic particle to silicon dioxide is between 13:1 and 1:2, preferably between 6:1 and 1:1.5, more preferably between 5:1 and 1:0.8, e.g. about 2:1.

Preferably, the step of calcining comprises heating to a temperature of at least 200° C., preferably at least 300° C., more preferably at least 400° C., and/or a temperature of at most 1,000, at most 900, at most 800, at most 700, at most 600° C., preferably at most 550° C., more preferably at most 530° C. Accordingly, calcining preferably comprises heating to a temperature of from 200° C. to 1,000° C., preferably from 300° C. to 900° C., preferably from 400° C. to 800° C., more preferably from 400° C. to 700° C., even more preferably from 450° C. to 550° C., e.g. about 500° C.

Such temperatures have been found as most suitable for forming an effective binder which provides the calcined powder coated article with improved filtration efficiency and increased tolerance to water. Such temperatures are particularly advantageous when the coated monolith article is a coated catalyst article, such as a coated catalytic wall-flow filter, since these temperatures allow for calcination of the silicone resin into a cross-linked silicon dioxide without negatively impacting the catalytic efficiency (i.e., without degrading the coated catalyst article). Ideally, calcination temperatures are kept as low as possible to reduce the likelihood of affecting catalytic activity of any catalyst present in the coated article.

The pore size of the calcined powder coating layer is preferably in the range of 1 μm to 100 μm, preferably from 1 μm to 50 μm, more preferably from 1 μm to 20 μm, or 5 μm to 20 μm.

The pore size of the calcined powder can be measured by techniques of the art, e.g. by Hg intrusion Porosimetry (MIP) on a Micromeritics Autopore instrument.

As used herein, the singular form of "a", "an" and "the" include plural references unless the context clearly dictates otherwise. The use of the term "comprising" is intended to be interpreted as including such features but not excluding other features and is also intended to include the option of the features necessarily being limited to those described. In other words, the term also includes the limitations of "consisting essentially of" (intended to mean that specific further components can be present provided they do not materially affect the essential characteristic of the described feature) and "consisting of" (intended to mean that no other feature may be included such that if the components were expressed as percentages by their proportions, these would add up to 100%, whilst accounting for any unavoidable impurities), unless the context clearly dictates otherwise.

As used herein, the term "$d_{90}$ (by volume)" refers to a $d_{90}$ (by volume) measurement as measured by a Malvern Mastersizer® 3000 with Aero s dispersion unit, available from Malvern Panalytical Ltd, Malvern, UK. Dispersion conditions: Air pressure=2 barg, feed rate=65%, hopper gap=1.2 mm. Refractive index and absorbtion parameters set in accordance with instructions provided in the Malvern Mastersizer® 3000 User Manual.

As used herein, the term "g/L" (grams per litre) refers to the mass of powder divided by the volume of the filter.

The foregoing detailed description has been provided by way of explanation and illustration, and is not intended to limit the scope of the appended claims. Many variations of the presently preferred embodiments illustrated herein will be apparent to one of ordinary skill in the art, and remain within the scope of the appended claims and their equivalents.

EXAMPLES

Washcoat Preparation

Washcoat A:

A washcoat comprising Cu exchanged zeolite (CHA, SAR=18.5, supplied by Tosoh, Cu loading=3.3 wt %) and stabilised gamma alumina (supplied by PIDC) with a 9:1 ratio suspended in water was prepared. The washcoat had a $d_{90}$ of 4-6 μm. TEAH at 4 wt % of the zeolite is added prior to the alumina addition.

Washcoat B:

A washcoat comprising Natrasol (a cellulose thickener), Cu exchanged zeolite (CHA, SAR=18.5, Cu loading=3.3 wt %, supplied by Tosoh), Arbocel UFC100 (a cellulose supplied by JRS) and Boehmite (supplied by PIDC) with a 9:5:1 (zeolite:arbocel:boehmite) ratio suspended in water was prepared. The washcoat had a $d_{90}$ of 20 μm.

Washcoat C:

A washcoat comprising Cu exchanged zeolite (CHA, SAR=18.5, supplied by Tosoh, Cu loading=3.3 wt %) and stabilised gamma alumina (supplied by PIDC) with a 9:1 ratio suspended in water. The washcoat had a $d_{90}$ of 4-5 μm. The surface of the zeolite was modified using an aminosilane (see US11192793B2).

Method for Preparing the In-wall Coated Filter, Filter A

Washcoat application according to EP3122458. Washcoat C was applied to the outlet end of a filter (SC18 supplied by NGK) to coat 80% of the filter volume, with a calcined loading of 1.5 $g.in^{-3}$ wrt to the whole filter volume. Washcoat A was applied to the inlet end of the filter to coat 30% of the filter volume, with a calcined loading of 0.6 $g.in^{-3}$ wrt to the filter volume.

Method for Preparing the On-wall Coated Filter, Filter B

Washcoat application according to EP3122458. Washcoat A was applied to the outlet end of a filter (SC18 supplied by NGK) to coat 80% of the filter volume, with a calcined loading of 1.5 $g.in^{-3}$ wrt to the filter volume. Washcoat B was applied to the inlet end of the filter to coat 80% of the filter volume, with a calcined loading of 0.6 $g.in^{-3}$ wrt to the filter volume.

General Method of Preparing Powder Coated Article

A mixture of Zeo (a chabazite zeolite with a $d_{90}$ of 4 μm and SAR of 23, available from Tosoh) and a Silres MK powder (a methyl silicone resin with a $d_{90}$ of 9 μm, available from Wacker) was prepared at various different weight ratios. The resulting mixed powder was sprayed onto a (on-wall) coated filter (Filter A) from the inlet end under a constant flow of air (using the spraying method of EP4013954A1). The air flow was 100-200 $m^3$/hr. The coated part was then calcined to 500° C. for 1 hour.

Example 1-Ratio study

Various different zeolite:silicone resin ratios were investigated, and the results are presented in Table 1.

The inlet end was sprayed using compressed air and then the outlet ends were sprayed using compressed air. The mass loss was then calculated.

TABLE 1

| Ex. No | Coating | CFBP/ mBar | Mass Loss/g |
|---|---|---|---|
| 1 | Zeo:Silres (1:1) | 54.5 | −0.1 |
| 2 | | 54.5 | |
| 3 | Zeo:Silres (3:1) | 61.3 | −1.4 |
| 4 | Zeo:Silres (4:1) | 63.4 | −1.7 |
| 5 | Zeo:Silres (5:1) | 64.6 | −3.2 |
| 6 | Zeo:Silres (8:1) | 66.4 | −4.3 |
| 7 | Zeo:Silres (10:1) | 70.5 | −5.5 |
| 8 | Zeo only | 74.7 | — |

Zeo is a CHA zeolite with a $d_{90}$ of 4 μm and Silres is a silicone resin with a $d_{90}$ of 9 μm.

Table 1 shows that the ratio of zeolite:silicone resin in the powder coating affects the cold flow back pressure and the stability. Loss mass indicates that the membrane layer produced is not stable.

Example 2-Filtration Efficiency Study

The filtration efficiency was tested under various conditions. The first conditions are oven cleaned with a cold start WLTC test (mass high), the second conditions are hot start WLTC test (mass high) and the third conditions are cold start WLTC (regen) test (mass low). WLTC is world light duty test cycle and regen conditions are elevated temperatures to break down the soot cake.

The results for a standard (in-wall) monolith article (Filter A), a (on-wall) coated monolith article (Filter B) and a powder coated monolith article (3:1 Zeo:SilRes) are shown in FIG. 1.

FIG. 1 shows that the powder coated monolith article according to the invention exhibits improved filtration efficiency compared to the standard (in-wall) coated monolith and the (on-wall) coated monolith article in all testing conditions.

Example 3-Back Pressure

The following samples were prepared:

| | | |
|---|---|---|
| I | 1:1 Zeo:SilRes | 45 g |
| II | 1:1 Zeo:SilRes | 60 g |
| III | 3:1 Zeo:SilRes | 60 g |
| IV | 1:1 CuZeo2:SilRes | 60 g |

Where SilRes is a standard silicone resin MK material, Zeo2 is an AEI zeolite and the amount given in g is the powder mass applied to the monolith.

Samples I-IV were fully submerged in a container of around 6 L of deionised water for approximately 10 s before removal from the water, shaking of the part to remove excess water and drying under airflow in an oven at 115° C. for around 45 min.

Cold flow back pressure tests were carried out on a Superflow Flowbench SF-1020, with samples I-IV before and after water submersion treatment at a flow rate of 600 $m^3$/h. The test results are shown in Table 2.

TABLE 2

| Sample | Initial CFBP/ mbar | Final CFBP/ mbar | Loss/ mbar |
|---|---|---|---|
| I | 103.7 | 92.1 | 11.6 |
| II | 104 | 95.3 | 8.7 |
| III | 95.2 | 94.8 | 0.4 |
| IV | 103.6 | 92.9 | 10.7 |

Table 2 shows that water submission caused only a slight change to the back pressure of sample III.

Example 4-Filtration Study

Figure 2:
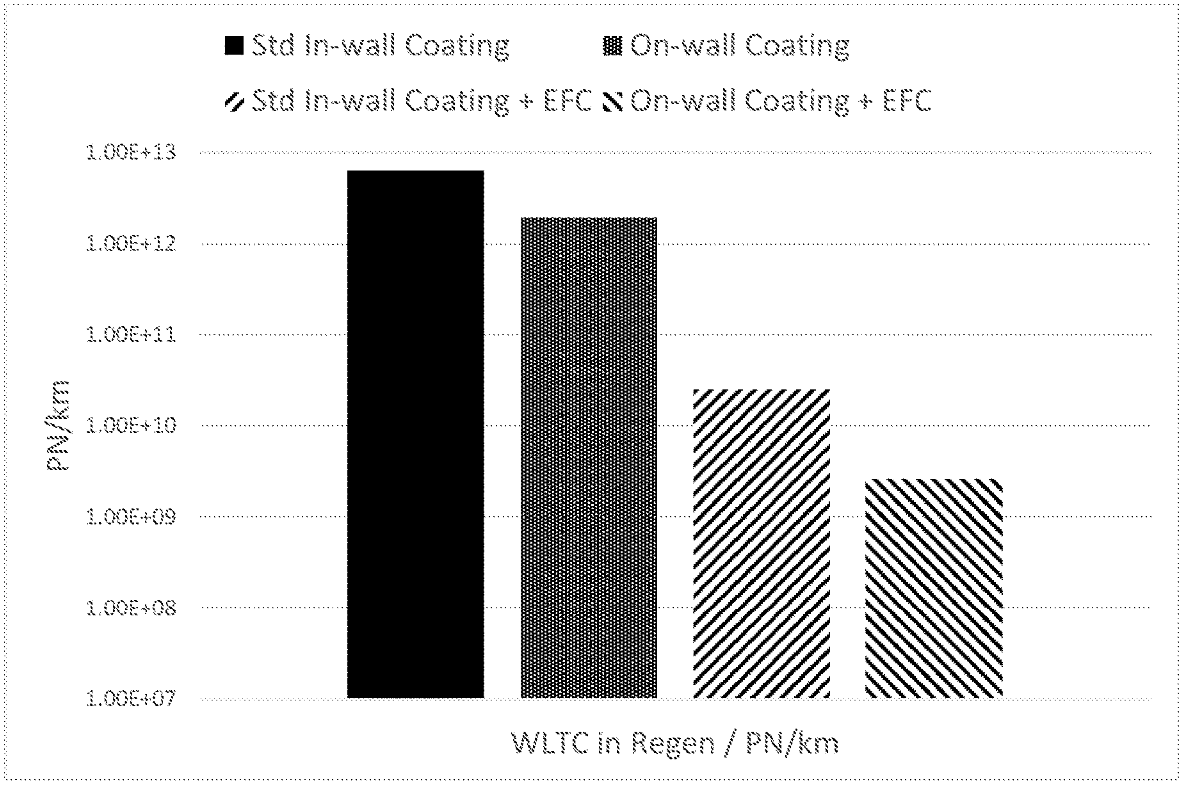
FIG. 2 shows that the filtration efficiency for a standard (in-wall) monolith article, a (on-wall) coated monolith article, an in-wall coated monolith article with a powder coating and a powder coated monolith article according to the invention

The filtration efficiency was tested and the results for a standard (in-wall) monolith article (Filter A), a (on-wall) coated monolith article (Filter B), an in-wall coated monolith article with a powder coating (Filter A+EFC) and a powder coated monolith article (Filter B+EFC) are shown in FIG. 2. EFC is the enhanced filter coating, i.e. the powder coating as herein described.

FIG. 2 shows that the powder coated monolith article according to the invention exhibits improved filtration efficiency compared to the standard (in-wall) coated monolith, the (on-wall) coated monolith article and the in-wall coated monolith with the powder coating.

The invention claimed is:

1. A powder coated article, said powder coated article comprising:

a) a coated monolith article, and b) a powder coating on the coated monolith article, wherein said coated monolith article is a monolith article coated with an on-wall washcoat, and said powder coating comprising an inorganic particle and a silicone resin in a ratio, by weight, of between 50:1 to 1:9;

wherein the coated monolith article is a coated catalytic wall-flow filter having a plurality of inlet channels and a plurality of outlet channels;

wherein at least 50% of washcoat in the inlet channels of the coated monolith article is present on-wall;

wherein the silicone resin has a melting point of less than 150° C. and a $d_{90}$ (by volume) of between 0.1 μm and 100 μm.

2. The powder coated article according to claim 1, wherein said inorganic particle is a small pore zeolite.

3. The powder coated article according to claim 1, wherein said inorganic particle is a CHA zeolite.

4. The powder coated article according to claim 1, wherein the ratio, by weight, of the inorganic particle to silicone resin is between 4:1 and 1:1.

5. The powder coated article according to claim 1, wherein the inorganic particle has a $d_{90}$ (by volume) of between 0.1 μm and 100 μm.

6. The powder coated article according to claim 1, wherein the mass loading of the powder coating is between 0.1 g/L and 50 g/L.

7. A method of forming a powder coated article according to claim 1, said method comprising:

i) providing a coated monolith article, ii) spraying onto the coated monolith article, as a dry particulate aerosol, inorganic particles and a silicone resin to form a powder coating layer, wherein said inorganic particles and silicone resin are in a ratio of between 50:1 to 1:9.

8. The method according to claim 7, wherein said spraying step is performed under a constant flow of gas.

9. The method according to claim 7, wherein said method comprises a further step of:

iii) calcining the powder coating layer to provide a calcined powder coated article.

10. The method according to claim 9, wherein said calcining step comprises heating to a temperature of at least 200° C. and at most 550° C.

* * * * *